Sept. 24, 1957        H. T. FARRELL        2,807,166
MEASURING DEVICE FOR LIQUID IN A CONTAINER
Filed May 11, 1956
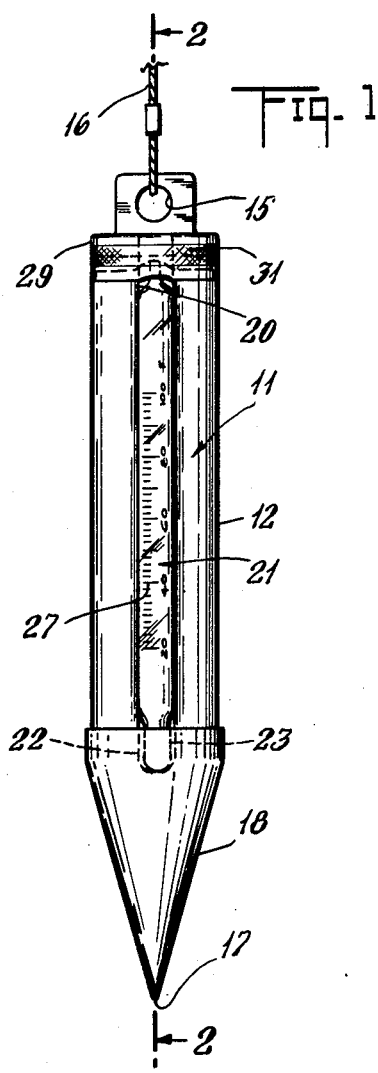
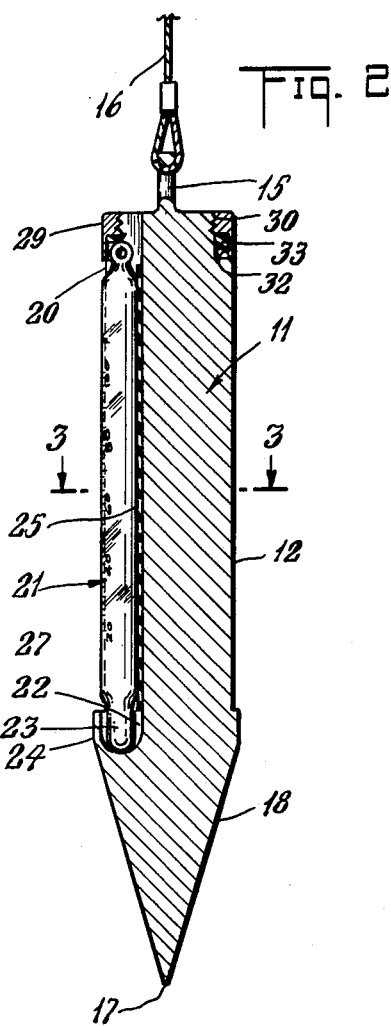
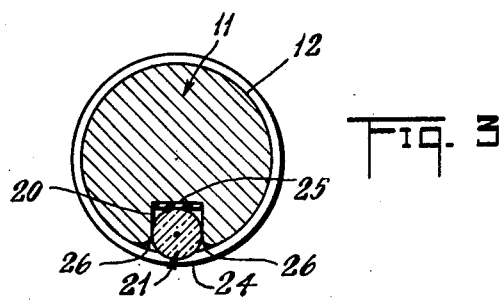
INVENTOR.
HENRY T. FARRELL
BY
Louis B. Applebaum
ATTORNEYS

United States Patent Office 2,807,166
Patented Sept. 24, 1957

2,807,166

MEASURING DEVICE FOR LIQUID IN A CONTAINER

Henry T. Farrell, Lake Ronkonkoma, N. Y.

Application May 11, 1956, Serial No. 584,404

1 Claim. (Cl. 73—292)

(Granted under Title 35, U. S. Code (1952), sec. 266)

The invention described herein may be manufactured and used by or for the Government of the United States of America for governmental purposes without the payment of any royalties thereon or therefor.

The present invention pertains to the art of measuring liquid in a container, with particular reference to volatile liquids, which vary volumetrically under temperature change. The invention is particularly useful for measuring liquid fuels, such as are used for transport vehicles.

For measuring the liquid in a container, it is common practice to suspend a weight from a suitable cord, lower the weight into the container until it touches bottom, and then measure the length of the cord that is wet to determine the depth of liquid in the container. Knowing other dimensions of the container, this measurement is an accurate indication of the volume of liquid in the container.

In the case of liquids that have a high coefficient of thermal expansion, such as aircraft fuels, and fuels for other vehicles of transport, the depth measurement of the liquid in the container is not a reliable measurement of the quantity of liquid that is available for fuel. In different climates, and under other circumstances of temperature differences, a given volumetric measurement of fuel will have different meanings at different temperatures as to the mileage value of the fuel for transportation. Between the cool of night and the warmth of day, the volumetric measurement of a given quantity of liquid fuel in a container will vary within wide limits, and this fact is demonstrated by different depth measurements of the liquid at different times of the day.

Accordingly, for an accurate understanding of the available fuel in the fuel container of a vehicle, it is advisable to know the temperature of the fuel at the time its volume is measured by the process of measuring its depth in the container. This is particularly important in the art of aviation.

It is customary in the design of fuel containers for airplanes to restrict their fuel capacities within relatively narrow limits, with reference to the particular purpose of the airplane. This is so because every pound of fuel, plus the weight of the fuel containers, is a limitation of the amount that the airplane is able to carry of the load it is expected to carry in flights for which it is designed. In addition, the geometric size of the fuel containers, and their placement and location in an airplane, establishes limitations in the flight characteristics of the airplane. Airplanes are designed for maximum useful load, which commonly is termed the "pay load."

Therefore, when the airplane is in use, the quantity of fuel it carries in the fuel containers of its design is a limiting factor with reference to its range of usefulness. This factor of range is particularly important in the use of airplanes for military purposes. In preparing an airplane for a given task order to be carried out at a distant point, or for a group of airplanes operating under a given strategic plan, it is important to know in advance that the airplane, or the flight of several airplanes, is capable of carrying sufficient fuel to travel to the location of the task order, perform its mission, and return safely to its original base, or to the safety of some other base that is available.

From these considerations it has become customary, when preparing one or more airplanes for a flight, to make an accurate check of fuel supply immediately before the flight is scheduled to begin. The present invention is embodied in an instrument that enables the fuel check before the beginning of a flight to be made more easily and quickly, and with less chance for error. This enables the fuel check to be made more nearly before the time of take off.

The present invention is embodied in a weight, which can be suspended from a cord into a container of liquid, and which embodies a thermometer. When the weight is used to measure the depth of liquid in a container, it provides a reading of the temperature of the liquid at the same time. By means of a chart prepared in advance in accordance with the thermal characteristics of the particular fuel, the mileage value of the fuel quantity in a given airplane is determined quickly and easily thereby. The instrument is constructed particularly to ready it after a given reading to make the next reading quickly and without delay, whereby the fuel check of a number of airplanes being prepared for a flight is made more quickly, and with less time interval before the time of take off.

The drawing presents one practical embodiment of the invention, from which the various advantages of the invention will appear. In the drawing:

Fig. 1 is a face view in elevation, of an instrument embodying the invention,

Fig. 2 is a cross-sectional elevation, taken on line 2—2 of Fig. 1, and

Fig. 3 is a cross-sectional plan, taken on line 3—3 of Fig. 2.

The instrument of the present invention comprises a weight 11 of metal or the like heavy material. It is noted particularly that the outside surface 12 of weight 11 is smoothly contoured to be free from cavities, and is cylindrical in the disclosed embodiment.

At its one end, weight 11 comprises an eye 15, to which a strand 16 may be attached in any suitable manner. At its opposite end, weight 11 comprises an abutment tip 17, to provide a small end surface of contact. In the structure shown, the abutment end 17 of weight 11 is formed by the taper 18, the tip 17 being rounded sufficiently to avoid injury to the bottom of a fuel container when the weight strikes.

Weight 11 is provided with a lengthwise seat 20, which is contoured to conform with the thickness and length of any suitable thermometer 21 to be used. The width of the slot is determined for the thermometer to fit into it snugly, as seen in Fig. 3.

At its one end, slot 21 is recessed into the metal at 22 to form a socket that contains the bulb 23 of the thermometer, and the diameter of weight 11 is enlarged as shown to form the apron or shield 24, which covers the thermometer bulb 23 and protects it against injury.

A buffer strip 25 is fitted along the bottom of slot 20, for the surface of thermometer 21 to bear against. Buffer strip 25 may be neoprene or the like yielding material, which will absorb shock. The depth of slot 20 is determined to locate the surface of thermometer 21 slightly above the cylindrical surface 12 of weight 11. This reduces the lengthwise notches 26 between the thermometer and the side surfaces of slot 20, to inhibit accumulation of oil and dirt that will detract from ability to read the scale of thermometer easily.

An abutment is provided to hold thermometer 21 seated in slot 20, with its bulb 23 protected behind shield 24 when it bears in the socket 22. In the disclosed embodiment, the attachment comprises a nut 29, and weight 11 is threaded at 30 to receive the nut, which is contoured cylindrical to be smoothly continuous with the cylindrical surface 12 of the weight. Nut 29 is knurled at 31, to enable its rotation by hand.

Nut 29 is counterbored at 32 to clear the thermometer at its end remote from bulb 23, and a yielding gasket is provided in counterbore 32 to engage thermometer 21 and hold it rigidly in slot 20.

Thermometer 21 is seated in slot 20, with its bulb 23 projected into socket 22. Nut 29 is then threaded onto weight 11 at 30, and thermometer 21 is held with its scale 27 exposed, while nut 29 is tightened into its position as shown.

When a depth reading and a temperature reading are taken of the fuel in a container, a cloth wiped along surface 12 of weight 11 will remove any accumulation of fuel or contaminant from scale 27 of thermometer 21, which is then ready for taking the next reading.

One practical embodiment of the invention is shown, the scope of which is determined by the accompanying claim.

I claim:

In an instrument for measuring fluid depth, an elongated weight comprising a smoothly contoured outer surface, the weight comprising a strand engaging eye at its one end and an abutment tip at its opposite end, there being a recess extending lengthwise of the weight along its surface, a thermometer contained in the recess, the recess being contoured to engage the surface of the thermometer along its length positioned in the weight with the surface of the thermometer extending smoothly continuously with the outer surface of the weight, there being a socket at one end of the recess to engage and hold the thermometer end, a detachable attachment at the opposite end of the recess to engage and hold the thermometer between the socket and the attachment in rigid engagement with the recess along its length.

References Cited in the file of this patent
UNITED STATES PATENTS

| | | |
|---|---|---|
| 1,947,592 | Haller | Feb. 20, 1934 |
| 2,155,635 | Bennett | Apr. 25, 1939 |
| 2,189,123 | Barker | Feb. 6, 1940 |